E. K. BAKER.
DEMOUNTABLE RIM CONSTRUCTION.
APPLICATION FILED AUG. 14, 1916.
1,399,041.
Patented Dec. 6, 1921.
2 SHEETS—SHEET 1.
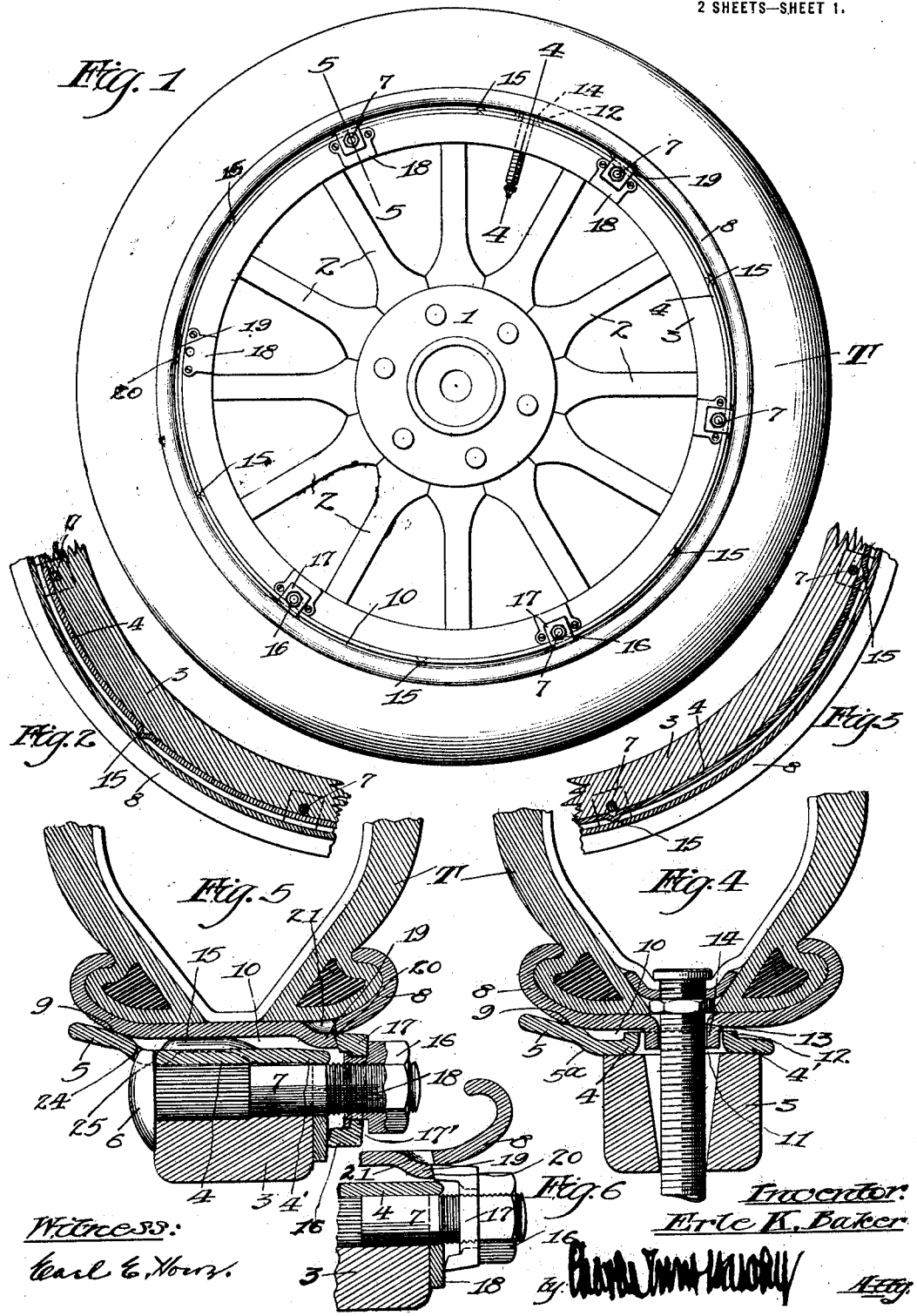

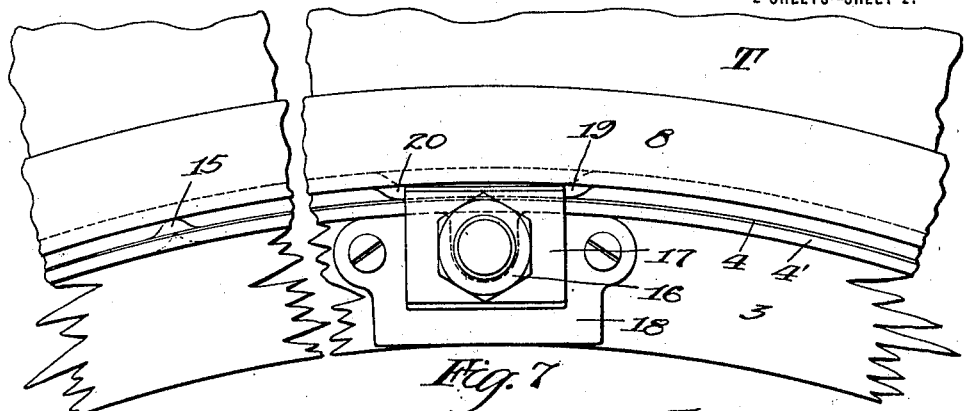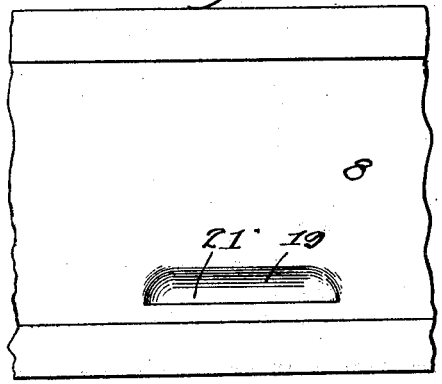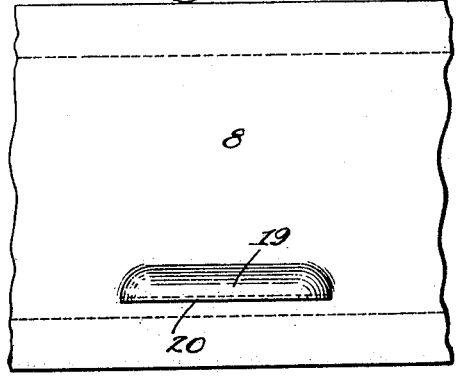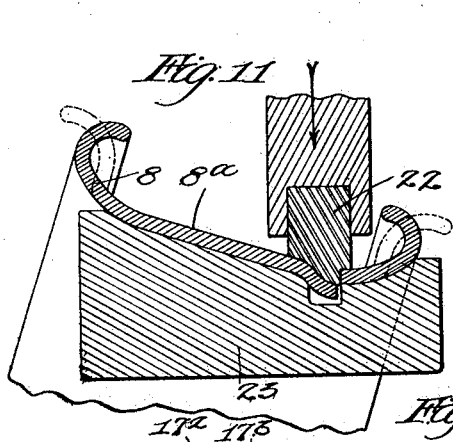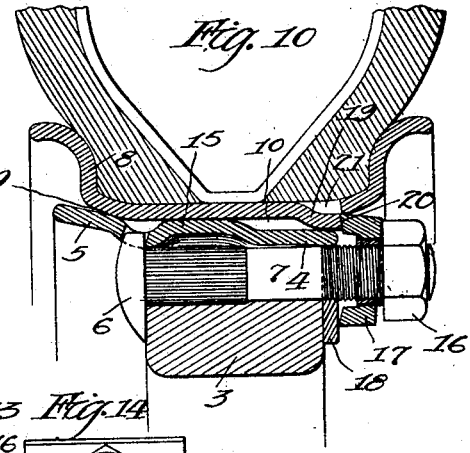

UNITED STATES PATENT OFFICE.

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE-RIM CONSTRUCTION.

1,399,041.     Specification of Letters Patent.     Patented Dec. 6, 1921.

Application filed August 14, 1916. Serial No. 114,799.

*To all whom it may concern:*

Be it known that I, ERLE KING BAKER, a citizen of the United States, residing at Chicago, Cook county, Illinois, have invented certain new and useful Improvements in Demountable-Rim Constructions, of which the following is a specification.

My invention relates to demountable rim constructions for motor vehicle wheels which are equipped with tires that require changing from time to time. It is the usual practice to put a pneumatic tire upon a demountable rim, and there inflate it before mounting the rim on the wheel of the motor vehicle. In event the tire is injured or deflated, the rim is demounted, and replaced by another bearing an inflated tire; and the detaching of the injured tire from its rim, as well as the repairing of the tire, may be postponed.

The objects of my invention will be made clear by the following statement of the problems and needs presented by the above defined practice.

The construction of a pneumatic tire is such that it does not lend itself to ready adjustment upon a rim or wheel. Therefore the rim should be made to fit the tire and should be so made that it will be easy to attach and detach the tire; and, the rim must be capable of safely and securely holding the tire, whether in service on the wheel or being carried as an inflated "spare." The rim and wheel construction should be such that it will be easy to both mount and demount the rim with its tire (whether inflated or deflated) and at the same time provide for the secure and dependable holding of the rim and tire against movement on the wheel during service. The true circular form of the tire and rim should be constantly maintained. The tire should be held truly perpendicular to the axis of the wheel. The distortion of either the rim or the tire should be avoided. The concentricity of the tire and rim with respect to the axis of the wheel should be positively insured and constantly maintained. Unless the demounting means responds to the above requirements the structure cannot be pronounced safe or desirable, and if the circularity, concentricity and perpendicularity of the tire are not maintained, it will be found that the life of the tire is materially shortened. In addition to these requirements, it is essential that the construction shall be of the least weight consistent with the service to be performed, and it is commercially necessary that the costs of manufacture and maintenance shall be low.

For use with standard clencher tires which have base beads that may be stretched over the flanges of the rim, the rim may be of the integrally flanged endless type, and, to that extent, simpler than those required for tires having non-stretchable base beads. To accommodate the latter I may either transplit the rim or provide it with a detachable flange. But in all other respects, the problem remains the same; for the matters of demountability, security, non-distortion, circularity, concentricity and perpendicularity are of equal importance as to all rims and tires.

The specific object of my invention is to provide a demountable rim construction which shall be applicable to rims and tires of all these types, and which shall provide a complete solution of all of the above stated problems.

The present invention is a modification of the forms shown and claimed in U. S. Patent No. 1,183,518. In other words, my present invention comprises a wheel having a single circumferential and conical rim seat formed on its periphery, and a tire-carrying rim having a complementary conical seat by which it is circumferentially fitted to said rim seat and is held out of contact with the remainder of the wheel periphery in combination with clamping means adjustable on the outer side of said wheel and pressing axially against said rim to clutch said seats together.

The general nature and principles of my invention, and also the details of the best embodiment thereof that I have thus far devised, will be understood on reference to the drawings which form part of this specification; and are particularly pointed out in the appended claims.

Referring now to said drawings:—Figure 1 is an outer side elevation of a fully equipped motor vehicle wheel embodying my invention; Fig. 2 is a somewhat enlarged section of a portion of the wheel felly and rim, showing one of the centering studs on the wheel; Fig. 3 shows a modified arrangement of the spacing and centering studs or embossments; Fig. 4 is an enlarged section on the line 4—4 of Fig. 1; Fig. 5 is a similar section on the line 5—5 of Fig. 1; Fig. 6 illustrates a modification of the washer, clip or pressure lug used between the bolt and the demountable rim; Fig. 7 is an enlarged outer side view of a portion of the wheel and rim showing one of the pressure lugs, and one of the centering studs; Fig. 8 shows the outer periphery of the demountable rim, as it appears where provided with one of the integral shouldered projections that coact with the clamping lugs; Fig. 9 is a similar view of the inner periphery of the rim; Fig. 10 is a sectional view like unto Fig. 5, but showing a straight side rim; Fig. 11 illustrates the method of making the integrally shouldered projections on the demountable rim; Figs. 12, 13, and 14 are detail views of one of the washers or lugs.

As shown in the drawings, 1 represents the wheel hub; 2 the radial spokes; 3 the wooden felly; and, 4 the endless metal felly band or fixed rim within which the felly and spokes are compressed. The fixed rim, 4, is provided with a raised conical flange, 5, which overhangs the inner side of the felly. Said fixed rim is secured in any suitable way, as by the usual tire bolts (not shown) and by the heads, 6, of the bolts, 7, as hereinafter described. To further secure the fixed rim I swage down the outer edge, 4', thereof, so that a conical portion of slight taper is provided for compressive co-action with the wooden felly.

The demountable rim, 8, may be of any desired cross section, according to the cross section of the tire to be used thereon. In Figs. 4, 5, 6 and 11 I have shown rims of the clencher type. Fig. 10 shows a rim of the straight side type.

It should be understood that all rims of the straight side type, if provided with integral flanges are transplit in accordance with my earlier patents, which adapts them for easy attachment to, and detachment from, the inexpansible base beads of a straight side tire. This feature of transplitting the rim is not of special moment in this present case, and is not detailed herein.

The demountable rim, in every case, is of greater circumference than the fixed rim, 4, and its innermost edge presents a conical surface, 9, which fits the conical flange, 5, of the fixed rim. An annular space, 10, remains between the two rims. This space allows the demountable rim to be "buttoned on" the wheel.

The first attachment of the demountable rim comprises a precautionary driving connection by which it is prevented from creeping or circumferential movement of the rim on the wheel. I use the term "precautionary" because in all cases the rim, as hereinafter explained, is so firmly seated on the wheel that it cannot move thereon. This driving connection, as illustrated in Figs. 1 and 4, may conveniently take the form disclosed and claimed in U. S. Patent No. 1,100,816, i. e., the felly band or fixed rim, 4, is provided with a valve stem hole, 11, and a struck-up reinforcing flange, 12, and the demountable rim is provided with a valve stem hole, 13, and a struck-down annular flange or boss, 14.

The rim, with its tire and valve stem, when placed on the wheel presents its boss, 14, within the valve stem hole, of the fixed rim. Thus an always dependable driving connection is formed between the wheel and rim. The rim buttons on to the wheel in the usual manner; that is, the rim hinges upon the valve stem as a center until the rim lodges against the conical back flange, 5, of the fixed rim.

At this point I wish to explain that the felly band or fixed rim here shown is made from cold-rolled stock of uniform thickness. The flange, 5, being of the uniform thickness and being of conical form presents a reliable peripheral seat for the demountable rim and possesses sufficient spring or resilience to conform therewith. By the employment of the spring back-flange, I insure a complete circumferential contact between the wheel and rim, notwithstanding irregularities of manufacture.

To secure the demountable rim upon the fixed rim, I thrust the demountable rim axially against or upon the conical flange, 5, of the fixed rim, as well shown in Figs. 1, 4, 5 and 10. And to insure the proper seating of the demountable rim I provide the fixed rim with a plurality of centering projections or cross ribs, 15. These are of substantially the same height as the space, 10, (they should not be higher) and as will be understood upon comparison of Figs. 5 and 7, the studs are in the form of cross ribs which extend substantially from the middle plane of the wheel to its back edge. As shown in Figs. 1 and 2 a centering stud or rib may be positioned between each two bolts, 7, or, as shown in Fig. 3, the centering projections may be positioned directly above the bolts. I prefer that the projections shall be made as shown; i. e., by embossing or raising the metal composing the fixed rim, at the desired points. Obviously three centering studs would be theoretically sufficient, but in most cases I prefer that there shall be five or more. They serve to initially center the rim on the wheel at the moment it is buttoned thereon, and thereafter serve as guides to direct the rim centrally or concentrically against the conical back flange, 5, of the fixed rim.

I employ as many of the clamping bolts, 7, as may be deemed necessary. As a rule five or six are sufficient. The bolts are spaced around the felly and may occupy any desired position with respect to the spokes, because there is no tendency to distort the wheel. The outer ends of the bolts are threaded and on each bolt I provide a nut, 16, and a washer or clamping lug, 17. The nut is preferably provided with a boss having its inner end, 16', expanded or clenched within the hole, 17', of the washer. Thus formed the two parts may be handled as one. The hole, 17', is large enough to provide a loose connection between the nut and washer or lug, 17, and permits the washer to adjust itself as shown in Fig. 5. I prefer that the washers or lugs shall be simple rectangular lengths or sections, cut from a hot-rolled steel bar, as best shown in Figs. 12, 13 and 14. The bar, and hence each lug or washer, is provided with parallel ribs, 17a, preferably of the same size; and these ribs are provided with inwardly inclined surfaces, 17b, whereby each lug is provided with sharp upper and lower bearing edges, 17c. When the washers are placed on their bolts the upper edges of the washers are presented beneath the overhanging part of the rim, as best shown in Figs. 5 and 10. The dimensions of the parts and their positions are such that, preferably, the demountable rim neither rests upon nor is supported by the washers. As explained in Patent No. 1,183,518, it is especially desirable that the clamping means shall have no tendency to distort either the demountable rim or the wheel felly. In some cases I use clips or washers having a long and a short rib, as shown in Fig. 6. But it is quite obvious that it is not as good an arrangement as that shown in Fig. 5. However, it accommodates a wider fixed rim, which is sometimes desirable.

In every case I prefer that the inner or lower bearing edge of the washer shall rest against a face plate, 18, attached to the felly of the wheel.

The demountable rim, whether of the clencher or straight side type, is made from rolled stock of preferably uniform thickness; and, to adapt it for co-action with the washers or clamping lugs, 17, I provide the demountable rim with inwardly extending, integral, shouldered projections, 19; there being as many thereof as there are clamping bolts and lugs. The latter act against respective projections, 19, and exert an axial force, or thrust, upon the demountable rim, which force causes the two conical seats (of fixed and demountable rims) to engage so firmly that the demountable rim acts as though integral with the fixed rim.

As shown, the projections, 19, are circumferentially spaced to correspond with the spacing of the clamping bolts and lugs, and, obviously to space them correctly it is necessary to take into consideration the position of the rim as fixed by the location of the valve stem of the tire and the driving connection (12, 14) between the fixed and demountable rims.

Each projection, 19, is formed by shearing and depressing a circumferentially short section of the demountable rim upon a line parallel with the outer flange thereof and so positioned that the resulting edge or shoulder, 20, shall project outward beyond the outer edge of the felly band or fixed rim.

Each projection is formed by one operation of a punch press; and the formation of the five or more projections does not materially increase the cost of the demountable rim. It will be clear that projections thus formed possess a maximum of strength, inasmuch as they are integral with the body of the demountable rim. Hence they are far superior to projections which are made from separate pieces, either riveted or welded to the rim.

It will be noted that the depressions, 21, in the rim are narrow and are in position to be fully covered by the base bead of the tire, T. Therefore, they are not objectionable from the standpoint of the tire.

The projections, 19, are preferably always of less depth than the annular space, 10, and particularly, this is the case when the outer edge of the fixed rim is swaged, as shown at 4' of Fig. 5. I prefer that the projections shall not ride or rest upon the fixed rim, as it is desirable to avoid distending the demountable rim or allowing pressure therefrom to be exerted upon the outer edge of the fixed rim. Nevertheless, the proportions may readily be modified to provide an actual bearing or contact between the projections and the fixed rim, as shown in Fig. 10.

As explained, the washer, 17, is loosely attached to the nut, 16, and there is considerable play between the two parts. And to insure the proper position of the washer against the projection, 19, of the rim I prefer that the latter shall present an inwardly and outwardly inclined face or edge, 20. This is clearly shown in Fig. 5. The formation of the projections in this manner is not difficult. In practice it is accomplished in the manner shown in Fig. 11, wherein 22 represents the punch tool; and 23 the lower die and gage. It will be noted that the lower gage is formed to support the demountable rim in an inclined position with respect to the vertical movement of the tool, 22. By operating the parts in these positions the rim is sheared upon the oblique planes described, i. e., planes which are oblique to the rim seat, 8a, of the demountable rim. While the described formation of the integral projections, 19, is much to be preferred, it is to be understood that my invention also contemplates the punching thereof upon planes, or shearing lines, which are perpendicular, or even acute to the rim seat, 8a.

In forming the conical back flange, the fixed rim is provided with a shallow circumferential shoulder, 5ª, I prefer not to depend upon this shoulder for co-action with the heads, 6, of the bolts. Instead, I punch short slots, 24, in the back flange, 5, of the fixed rim, providing one slot for each bolt head, 6. These slots permit the bolts to be driven into position, and provide positive abutment shoulders, 25, for the bolt heads. It may be explained that the back flange springs sufficiently to allow the bolt head to enter the slot when the bolt is driven through the bolt hole in the felly. By providing this positive abutment between the bolt and fixed rim danger of dislodging the fixed rim from the felly is avoided; without this the tightening of the bolts and washers against the demountable rim would tend to push the fixed rim axially across the felly.

That form of my invention which is herein shown and described possesses the advantages of maximum strength, the best possible distribution of material, and minimum cost.

To those who are skilled in the art, it will be apparent that by means of the structure herein disclosed, I accomplish the fulfilment of all the objects and requirements set forth in the opening paragraphs of this specification.

While I have illustrated and described my invention in accordance with the patent statutes, I desire it to be understood that the details of construction may be materially varied and that many changes, modifications and substitutions may be made in the demountable rim construction herein illustrated without departing from the spirit and scope of my invention as set forth in the appended claims.

I claim:—

1. A demountable rim construction comprising a fixed rim having a conical, circumferential rim seat on its periphery, in combination with an integrally flanged demountable tire carrying rim having a complementary rim seat, said demountable rim having a plurality of integral projections on its inner periphery near its outer edge, said projections presenting oblique outer shoulders, pressure lugs complementing respective projections, and screw means for actuating said lugs.

2. A demountable rim construction comprising a fixed rim having a conical, circumferential back flange and provided with a plurality of rim centering studs near said flange, in combination with an integrally flanged demountable tire carrying complementary rim having a plurality of shouldered projections on its inner periphery near its outer edge, and pressure means adapted to act against said projections.

3. A demountable rim construction comprising a fixed rim having a circumferential, conical, spring back flange and provided with a plurality of rim centering studs near said flange.

4. A demountable rim construction, comprising a fixed rim of uniform thickness, said rim having a back flange or rim seat portion and being provided with a plurality of circumferentially spaced bolt head slots, substantially as described.

5. A demountable rim construction having a fixed rim which presents a conical back flange and which is provided with a plurality of embossed rim centering studs adjacent said flange.

6. A demountable tire carrying rim provided with a plurality of circumferentially spaced sheared and pressed down portions presenting oblique shoulders upon the inner periphery of the rim.

7. A wheel and its fixed rim in combination with a demountable rim enough larger than the fixed rim to permit it to be buttoned thereon, a plurality of clamping bolts axially positioned in the felly of said wheel, demountable rim securing parts provided on the outer ends of said bolts and said fixed rim being provided with embossed demountable rim centering projections, and said projections being positioned directly over respective bolts.

8. A demountable rim construction comprising a fixed rim having a conical circumferential back flange provided with a plurality of rim centering studs extending substantially from the center plane of the rim toward and into approximate relation with said flange, and each having its outer edge tapered inwardly.

9. A one-piece integrally flanged demountable rim having a plurality of pressed-down parts (19) adjacent its outer side flange in position to be covered by the base bead of a tire, and each said part (19) presenting a sheared edge (20) at an oblique angle to the inner periphery of the rim.

10. A one-piece integrally flanged demountable rim having a plurality of pressed-down parts (19) adjacent its outer side flange in position to be covered by the base bead of a tire, each said part (19) presenting a sheared edge (20) at an oblique angle to the inner periphery of the rim, in combination with a complementary fixed rim provided with a back flange and having suitable rim centering studs so positioned as not to interfere with said projections (19) of the rim.

In testimony whereof, I have hereunto set my hand this 9th day of August, 1916.

ERLE KING BAKER.